Nov. 18, 1969
L. D. MILLER
3,479,057
TRAILER HITCH SAFETY DEVICE
Filed May 4, 1967
2 Sheets-Sheet 1
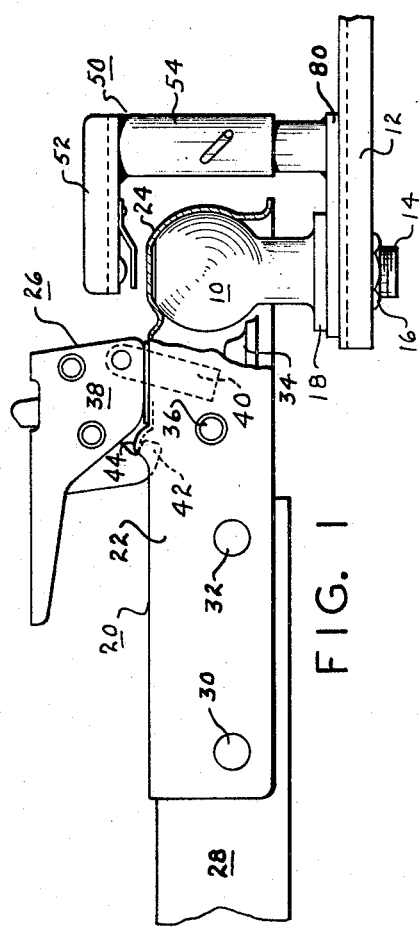
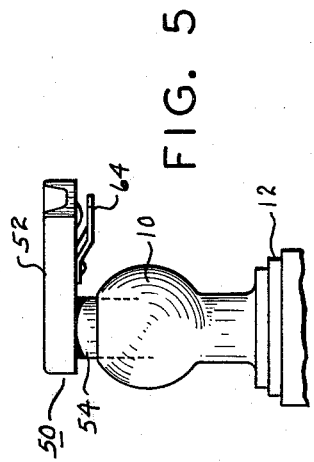
INVENTOR.
LESTER D. MILLER
BY
M. A. Hobbs
ATTORNEY Nov. 18, 1969   L. D. MILLER   3,479,057
TRAILER HITCH SAFETY DEVICE Filed May 4, 1967   2 Sheets-Sheet 2

INVENTOR.
LESTER D. MILLER
BY M. A. Hobbs
ATTORNEY

United States Patent Office 3,479,057
Patented Nov. 18, 1969

3,479,057
TRAILER HITCH SAFETY DEVICE
Lester D. Miller, Ligonier, Ind., assignor to Bangor
Punta Operations, Inc., Goshen, Ind.
Filed May 4, 1967, Ser. No. 636,167
Int. Cl. B60b 7/00; B60q 1/00; G08b 21/00
U.S. Cl. 280—511                          4 Claims

ABSTRACT OF THE DISCLOSURE

A signal device for use with an automobile and trailer hitch assembly having a ball member and a socket member, in which a signal switch is supported above the socket member of the assembly, normally in spaced relation thereto, so that in the event the socket member becomes loosened from the ball member the switch will be closed by partial disengagement of the socket member from the ball member. The switch is mounted on a support having sufficient rigidity to prevent the socket member from becoming accidentally fully disengaged from the ball member.

---

Hitches used to connect an automobile and a trailer, mobile home or the like, usually consist of a ball-like member, mounted on a bracket attached to the automobile and a hitch member having a socket seating on the ball member. A lock or latch retains the socket member in place on the ball member. The socket and ball members must be adapted to pivot laterally through a wide angle and to rotate relative to one another to permit slight angular adjustment between the towing and towed vehicles. Since the ball bracket is firmly attached to the automobile and the socket member is rigidly secured to the front frame members of the trailer, the lock for retaining the socket member on the ball member must form a firm and reliable connection between the two vehicles, while permitting the two members to rotate and pivot freely. However, the lock may become defective from wear, road jarring and vibration, or it may be improperly locked or accidentally left unlocked after the two vehicles are connected, allowing the socket member to ride unsecured on the ball member. With the two members connected in this manner, bouncing or swerving of either vehicle can easily result in the parts becoming uncoupled, permitting the trailer to veer off the road or into the oncoming lane of traffic before coming to a stop. The unsecured condition of the ball and socket members is frequently not known to the driver until the trailer breaks away from the automobile, and after the driver has lost control of the trailer. It is therefore one of the principal objects of the invention to provide a relatively simple device which will produce a signal when the vehicles are being driven with the ball and socket members unsecured, regardless of whether the unsecured condition is the result of a failure to lock the parts together or from a defective locking mechanism.

Another object of the invention is to provide a device mounted on the bracket for the ball which serves as an emergency retaining structure in the event the primary lock for the socket member becomes unlatched, and which can be easily shifted between locked and unlocked positions without the use of any tools or special equipment and will automatically snap into locked position when released by the operator.

Still another object of the invention is to provide a combination signal and locking device for a trailer hitch, which signals the driver when the locking means of the hitch has become unlatched and which will retain the ball and socket members together until the vehicles can be safely stopped.

A further object is to provide a trailer hitch signal and locking device which can readily be installed on existing and new ball members without changing the construction thereof, and which does not interfere with the normal operation of the hitch and remains inoperative until the hitch becomes accidentally or unintentionally unlocked while the vehicles are in motion.

Additional objects and advantages of the invention will become apparent from the following description and accompanying drawings, wherein:

FIGURE 1 is a side elevational and partial cross-sectional view of a trailer hitch including the ball and socket members attached to an automobile and to the forward end of the trailer frame, respectively, showing the present safety device mounted thereon;

FIGURE 5 is a side elevational view of the ball member and safety device showing the device in its unlatched position.

Figure 2:
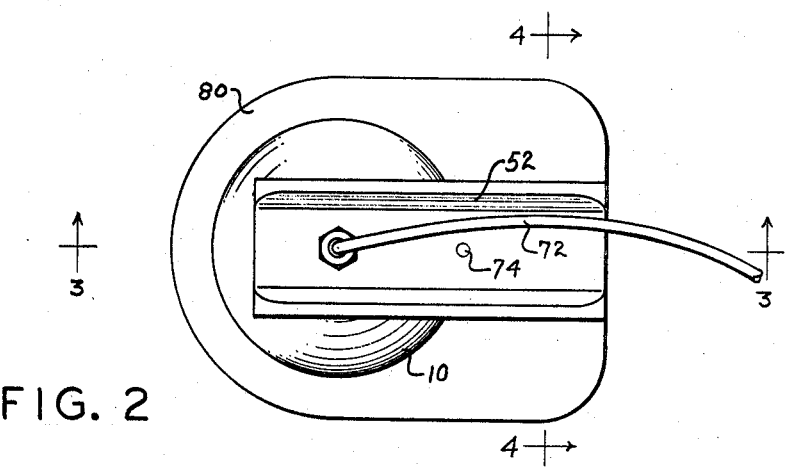
FIGURE 2 is a top plan view of the ball member and the present signal and locking device.

Referring more specifically to the drawings and to FIGURE 1 in particular, numeral 10 designates generally a ball member mounted on a bracket 12 which in turn is secured to a tow bar or other supporting structure attached to the automobile. The ball member is attached to the bracket by a threaded stem 14, extending downwardly through a hole in bracket 12, and a nut 16 tightened against the underside of the bracket and holding an annular flange 18 of the ball member firmly against the upper side of the bracket. Numeral 20 designates the socket member of the hitch consisting of a shell 22 having a socket 24 for seating on ball 10 and a lock mechanism indicated generally by numeral 26. The rear end of the socket member is secured to the forward end of the trailer frame members 28 by bolts 30 and 32 extending through the shell and frame members, rigidly securing the socket member to the frame. The lock 26 consists of an inner restraining member 34 which extends inwardly along the underside of ball 10 when in locked position. This member is pivoted on a pin 36 and is moved between the locked position shown in FIGURE 1 and an unlocked position with the member 34 withdrawn from the ball, the member being operated by a lever 38 connected to a link 40 which in turn is connected to member 34 so that, as lever 38 is pivoted upwardly, member 34 moves away from the ball, thus releasing the socket member. When lever 38 is moved to its locking position as seen in FIGURE 1, a latch 42 extends into a retaining member 44 on the top side of socket member 20. The structure thus far described may be considered conventional for the purpose of the present disclosure and, if properly used and serviced, will perform satisfactorily and safely under all operating and road conditions. Since proper care and operation often are not maintained, the present device is used in conjunction with the foregoing structure to provide the necessary safety of operation.

The present signal and locking device generally indicated by numeral 50, consists of an arm 52 secured to a post 54 having a lower section 56 and an upper section 58 telescopically mounted on the lower section. The arm extends over ball 10 and over the socket portion of member 22, but normally in spaced relation to both members. A switch 60 is mounted in arm 52 and contains a fixed electrical contact 62, and a movable contact 64, the former being rigidly secured in the arm by a nut 66 threadedly received on the upper end of the contact. The contact is insulated from the metal of the arm by an insulating sleeve 68 extending through hole 70 in the underside of the arm. A lead 72 connects contact 62 with the automobile battery or other suitable electric current to a signal such as a light on the instrument panel. As shown in the drawings, contact 64 is a leaf spring-like member normally held in spaced relation to contact 62 and is firmly mounted on the underside of the arm by a rivet 74 in such a manner as to serve as a ground for the switch. Various types of switches can be used in place of the two contacts 62 and 64, including a completely enclosed switch, so long as an operating member thereof will be contacted by a partially disengaged socket member.

Figures 3, 4:
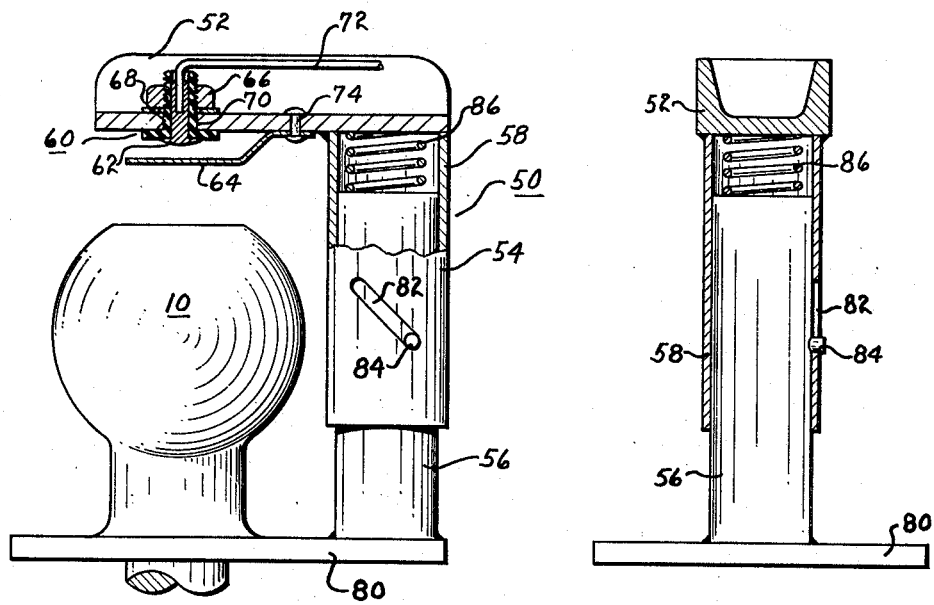
FIGURE 3 is a side elevational and partial cross-sectional view of the structure shown in FIGURE 2, the section being taken on line 3—3 of FIGURE 2.
FIGURE 4 is an elevational and partial cross-sectional view of the structure shown in FIGURE 2, the section being taken on line 4—4 of the latter figure.

Post section 56 is rigidly secured to base 80 by welding or other suitable securing means and supports section 58 in telescopic relation, section 58 being mounted over section 56 and adapted to move between locked and unlocked positions, as shown in FIGURES 3 and 5, respectively. A slot 82 in sleeve 58 and a pin 84 attached to the side of section 56 cooperate with one another to cause section 58 to rotate on section 56 when section 58 is pressed downwardly, thus moving arm 52 angularly from a position directly over ball 10 to a position lateral therefrom. When the arm 52 is in its lateral position, socket 24 can be easily seated on and removed from ball 10. A coil spring 86 disposed in sections 56 and 58 urges section 58 upwardly, causing the slot and pin arrangement to rotate section 58 and thus move arm 52 angularly to its original position directly over the ball 10 and socket 24. The spring in cooperation with the slot and pin causes arm 52 to move automatically from the unlocked to the locked position, where it is retained as long as the automobile and trailer are in operation.

In the operation of the present trailer hitch and signal device with the device mounted on bracket 12 in the manner illustrated in FIGURE 1, the trailer is connected to the automobile by placing socket 24 of member 22 over ball 10 while the signal and locking device is held in its angular position as illustrated in FIGURE 5, i.e. with section 58 depressed downwardly over section 56 in opposition to spring 86. After socket 24 has been placed over ball 10, the operator releases arm 52, permitting spring 86 to move section 58 upwardly. Slot 82 and pin 84 cause section 58 to rotate from its angular position as shown in FIGURE 5 to the position directly above the ball as illustrated in FIGURES 2 and 3. The socket member is locked in place on the ball by latch 42 which is moved to and held in its locked position by lever 38 and link 40. When the automobile and trailer are traveling in the normal manner, latch 34 holds socket 24 in place on ball 10; however, in the event lock mechanism 26 becomes defective or is not properly locked by the operator, socket 24 is free to bounce upwardly from the ball as the vehicles traverse bumpy or rolling highway surfaces. When lock mechanism 26 becomes disengaged from the ball, the socket member 24 would bounce upwardly under adverse road conditions sufficiently to disengage itself completely from ball 10 if the present device were not incorporated in the installation. With the present device, however, the bouncing of socket member 24 is restricted by arm 52, such that socket 24 remains on ball 10 and retains the two vehicles intact, in a safe, coupled condition. In addition to preventing the disengagement of socket member 24 from ball 10, the present device signals the driver by the operation of switch 60 which is closed each time socket 24 bounces upwardly and engages contact 64, pushing it upwardly sufficiently to seat on contact 62, and thereby closing the circuit to a signal light or buzzer in the driver compartment. With this warning, the driver is able to drive the vehicle safely from the moving traffic to a location where the coupling between the hitch members can be corrected and/or the hitch repaired.

While the structure illustrated in the drawings is the preferred embodiment of the present invention, the spring, slot and pin arrangement controlling section 58 may be omitted and the two sections held together and in operative position by a pin or a bolt extending transversely through the two sections holding the sections rigidly together. In order to move arm 52, the bolt or pin is removed, thereby permitting section 58 to rotate on section 56 to an angular position, such as that illustrated in FIGURE 5, which permits the socket member to be removed from the ball.

I claim:

1. For use with an automobile and trailer hitch assembly having a ball member supported by a bracket on one of the vehicles and a socket member supported by the other vehicle: a safety device comprising a support member connected to said bracket and having upper and lower sections, the lower section being rigidly connected to said bracket and the upper section being telescopically mounted on said lower section, an angularly movable arm rigidly mounted on said upper section and extending to a position above the socket member when the ball and socket members are connected to one another said arm being adapted to pivot angularly from a position directly above the socket member to a position lateral therefrom, a yieldable control means constantly urging said arm angularly to its safety position above the socket member, and a switch means mounted on said arm in such a relation to the socket member that the socket member will close the switch upon partial disengagement of said ball and socket members.

2. A signal device as defined in claim 1 in which said yieldable control means includes a spring mounted in said sections for urging said upper section vertically, and a slot and pin disposed in said sections to cause angular movement by said arm from a position laterally of the ball member to a position directly above said ball member.

3. A signal device as defined in claim 2 in which said slot is disposed in said upper section and said pin is disposed in said lower section and extends through said slot.

4. A signal device as defined in claim 3 in which said spring is disposed within said upper and lower sections and urges said arm to a position directly above said ball.

References Cited

UNITED STATES PATENTS

| 2,845,281 | 7/1958 | Holder et al. | |
| 2,697,618 | 12/1954 | Hulstedt | 280—515 |
| 2,705,157 | 3/1955 | Dail | 280—515 |
| 3,047,839 | 7/1962 | Brown et al. | 340—52 |

FOREIGN PATENTS

| 234,166 | 6/1961 | Australia. |
| 238,832 | 8/1925 | Great Britain. |

LEO FRIAGLIA, Primary Examiner

U.S. Cl. X.R.

200—52, 61.41; 280—432, 446, 504; 340—52, 275